US005155496A

United States Patent [19]

Suga

[11] Patent Number: 5,155,496

[45] Date of Patent: Oct. 13, 1992

[54] DEVICE FOR AUTOMATICALLY EXPANDING AND CONTRACTING ANTENNA

[75] Inventor: Mitsuhiro Suga, Warabi, Japan

[73] Assignee: Nippon Antenna Company Limited, Tokyo, Japan

[21] Appl. No.: 449,936

[22] PCT Filed: May 2, 1989

[86] PCT No.: PCT/JP89/00462

§ 371 Date: Dec. 21, 1989

§ 102(e) Date: Dec. 21, 1989

[87] PCT Pub. No.: WO89/11167

PCT Pub. Date: Nov. 16, 1989

[30] Foreign Application Priority Data

May 2, 1988 [JP] Japan ............................... 63-107532

[51] Int. Cl.[5] ...................... H01Q 1/100; H02P 3/080

[52] U.S. Cl. .................................. 343/903; 318/265; 318/266

[58] Field of Search ........................ 343/715, 901-903, 343/888-889; 318/265, 266, 626

[56] References Cited

U.S. PATENT DOCUMENTS

| | | | |
|---|---|---|---|
| 3,143,696 | 8/1964 | Harris | 343/903 |
| 4,153,825 | 5/1979 | Flora | 200/47 |
| 4,190,841 | 2/1980 | Harada | 343/903 |
| 4,864,322 | 9/1989 | Yamamoto et al. | 343/715 |
| 4,875,053 | 10/1989 | Harada | 343/903 |

FOREIGN PATENT DOCUMENTS

| | | | |
|---|---|---|---|
| 0166302 | 12/1980 | Japan | 343/901 |
| 0150302 | 9/1983 | Japan | 343/903 |
| 0013102 | 1/1987 | Japan . | |
| 875483 | 8/1961 | United Kingdom . | |
| 1223614 | 2/1971 | United Kingdom . | |
| 1435493 | 5/1976 | United Kingdom . | |

*Primary Examiner*—Michael C. Wimer
*Assistant Examiner*—Peter Toby Brown
*Attorney, Agent, or Firm*—Frishauf, Holtz, Goodman & Woodward

[57] ABSTRACT

A device for automatically expanding and contracting an antenna having a rotary member for moving a flexible rodlike member that is coupled to the antenna for expanding and contracting the antenna. A worm is driven by a motor to rotate about a motor axis and an intermediate gear unit having a worm wheel is formed unitarily with a small diameter gear, the worm wheel being engaged with the worm and the small diameter gear being engaged with the rotary member for rotatably driving the rotary member. A gear unit support frame is provided for supporting the intermediate gear unit and a support shaft is fixed to a casing member and coupled to the intermediate gear unit, the intermediate gear unit and the gear unit support frame being axially movable along the support shaft in a direction substantially perpendicular to the motor axis. A limit switch means is provided for interrupting a power-feed circuit that supplies power to drive the motor in either a forward or reverse direction, and a switch operation means operates the limit switch means responsive to a movement of the gear unit support frame along the support shaft.

10 Claims, 6 Drawing Sheets

DEVICE FOR AUTOMATICALLY EXPANDING AND CONTRACTING ANTENNA

TECHNICAL FIELD

The present invention relates to a device for automatically expanding and contracting an antenna. More specifically, the invention relates to a device which is constructed relatively simply and compactly in a clutchless manner, which automatically expands and contracts the antenna smoothly, which protects the wire, which is constructed at a reduced cost, which is highly durable, and which, under abnormal conditions, prevents a motor for driving the expansion/contraction operation from being burned out.

BACKGROUND ART

Automatically expanding and contracting an antenna mounted on an automobile or any other vehicle involves expanding and contracting the antenna from inside the vehicle such as from inside the driver's room which, in practice, is very useful and has heretofore been widely employed. In automatically expanding and contracting the antenna, however, it is generally accepted practice to execute a clutch function when the antenna is fully expanded or is fully contracted to disconnect the drive force from the motor. So far, such a clutch mechanism has chiefly been incorporated in a portion of the rotary member such as a gear that drives the winding of the antenna expansion/contraction wire or that drives the operation wire. The clutch is put into operation when a rotational resistance (load) greater than a predetermined value is generated in such a portion.

Systems which do not employ clutch means have been disclosed in U.S. Pat. No. 4,153,825 and JP-AS No. 57-28962. In the mounted on a worm shaft that is driven by a motor being opposed thereto using a support ring, and a switch provided in a circuit for driving the motor in the forward direction or in the reverse direction is turned off by the operation member when an overload is exerted such as when the antenna is fully expanded or is fully contracted. If mentioned in detail, the worm and the operation member fastened to the worm are suppressed by a coil spring so as not to be thrusted in the axial direction in the load of the members at the back of the worm wheel when the antenna is expanded or contracted. When the antenna is fully expanded or is fully contracted, the operation is stopped after an overload is produced on the motor wheel. As the motor continues to rotate, therefore, the thrust that exceeds the suppressing force of the coil spring urges the worm such that an operation member is urged (one operation member is urged toward the coil spring interposed between the operation members at the time of forward rotation, and the other operation member is urged toward the coil spring at the time of reverse rotation), and whereby the switch is turned off to stop the motor.

In the latter system described in JP-AS No. 57-28962, on the other hand, a pair of circuit breakers are provided for a path that supplies electric power to turn in the forward direction the motor that drives a wire transfer mechanism which expands or contracts the antenna and for a path that supplies electric power to turn the motor in the reverse direction. When the antenna is fully expanded or is fully contracted, a heavy current flows into the power supply path through the circuit breaker; i.e., the power supply path is opened and the motor is stopped. The above circuit breakers are so coupled together that when a contact of one circuit breaker is opened, a reset button of the other circuit breaker is actuated. To realize such an operation, the two circuit breaker cases are coupled together as a unitary structure as shown in FIG. 2 of the above publication. A slidable reset button is provided between the breaker pieces that undergo thermal deformation when a heavy current flows in the cases, and a contact or a terminal of each of the drive power supply paths is provided on the breaker cases, so that the operation is repeated when the antenna is fully expanded or is fully contracted.

In the above-mentioned conventional systems, the clutch mechanism requires a considerably great clutch force; i.e., the clutch mechanism has a diameter which is so great as to be nearly equal to that of the drum. To obtain such a large clutch force, furthermore, a correspondingly large spring must be incorporated in the drum shaft. Therefore, the drum portion becomes considerably bulky in the axial direction, and the whole mechanism becomes bulky. Furthermore, in becomes difficult to maintain normal operation as the clutch force is weakened after the clutch operation is repeated many times or under poor local conditions.

In the above-mentioned conventional system disclosed in said U.S. Patent, furthermore, the switching operation or the switching force is obtained in the final output portion necessitating a large and rigid structure. That is, the operation for expanding or contracting the antenna finally requires an output which is greater than a predetermined value. To switch the clutch operation in the final output portion, furthermore, the members for clutch operation must inevitably be large in size and strong. In the above-mentioned general clutch, for example, the rotary member such as a drum or a gear that is a final output member has a large diameter so that it will not damage and will not deform a wire made of a synthetic resin. The clutch mechanism provided in the portion of the final output rotary member must exhibit braking action that meets the final output and, hence, must have a diameter comparable with that of the final output member. Furthermore, the spring employed therein must have a large resilient force; i.e., the spring becomes bulky. In the system of the above U.S. Patent, the worm must produce a considerably large output to drive the rotary wheel, and the operation member and the coil spring provided for the worm shaft via a support ring or the like must be made of a special material having considerably large strength and bulk. That is, the coil spring must effectively suppress the generation of thrust caused by the expanding or contracting force for the members at the back of the wheel that corresponds to the final output and must, hence, be considerably strong. The operation members are assembled employing such a strong coil spring, and are therefore bulky and rigid. The motor itself receives the load of the coil spring at all times, and directly acts on the final output portion, and must, hence, produce a large output. Furthermore, the motor shaft moves during the moment of overload and generates vibration which adversely affects the commutator. The overload directly acts even on the worm, and the teeth must have a sufficiently large strength.

In the system of JP-AS No. 57-28962, the operation is controlled electrically not mechanically, and a movable contact spring which is a circuit breaker must undergo deformation to overcome the action of a reversing spring when a heavy current flows therethrough to heat it. After the antenna is fully expanded or is fully contracted, therefore, a time lag is always involved before the circuit is opened by the circuit breaker and excessive force is always given to the mechanism during this moment. Therefore, the worm shaft, gear shaft and the mechanism for transferring the wire, that are driven by the motor, must nave considerably large strength. Moreover, the first and second circuit breakers provided in the drive power supply paths are coupled together, and a device having a slidable reset button is particularly provided between these circuit breakers so that one breaker is reset when the other one is opened. Therefore, the mechanism becomes complex and expensive, and generates heat during the ordinary operation which is not desirable.

When the device for automatically expanding and contracting the antenna is mounted on a vehicle, furthermore, there inevitably develop such abnormal conditions as bending of the antenna element, erroneous operation of the limit switch mechanism, drop in the voltage due to insufficiently charged condition of the car-mounted power source (storage battery), and external conditions due to change in environment. To cope with such abnormal conditions, it is necessary to provide a particular protection circuit (fuse or the like). It is further necessary to provide a timer circuit which secondarily shuts off the power source when an abnormal instruction signal is received from a sensor in the electronic circuit or when a current flows for longer than a predetermined period of current-carrying time, or a shut-off circuit employing a particular bimetal such as of the automatic reset type or the manual reset type.

DISCLOSURE OF THE INVENTION

In order to solve problems inherent in the above-mentioned background art, the present invention provides the device described below.

A device for automatically expanding and contracting an antenna comprises a rotary member such as a drum or a gear for moving a wire or a rope that works to expand and contract the antenna element, and a worm and a worm wheel that are driven by a motor for rotating the rotary member. The worm wheel is formed as an intermediate gear unit that has a small-diameter gear unit formed as a unitary structure and that engages with the gear of said rotary member, and the intermediate gear unit is allowed to move together with the gear unit support frame with respect to a support shaft. The gear unit support frame includes switch operation units. A limit switch employing a reversing spring is provided in the power-feed circuits that supply power to said motor to turn it in the forward direction or in the reverse direction. Resilient arm members are disposed on said limit switch, and the resilient arm members are operated by the switch operation units of said gear support frame.

A device for automatically expanding and contracting an antenna as set forth above, wherein a reversing spring of each of the limit switches is composed of a bimetal, a control resilient piece is arranged that moves following the resilient arm member of said limit switch, and a limit member is movably provided between the control portions formed for the control resilient pieces to limit the operation range when said reversing spring is opened.

A device for automatically expanding and contracting an antenna as set forth above, wherein a rigid control operation piece is provided for the resilient arm members that turns on or off the reversing spring of the limit switches, a limit member is movably provided between the control portions formed for the control operation pieces to limit the operation range when said reversing spring is opened, and said control operation piece is provided with a resilient pressing piece that gives frictional resistance to the motion of said control operation piece.

The rotary member such as a drum or a gear is rotated by the worm driven by a motor to deliver or pull the wire or the rope that expands or contracts the antenna element via an intermediate gear unit which has a worm wheel and a small gear formed together therewith as unitary structure, and whereby the antenna element is expanded or contracted.

On the intermediate gear unit is formed a gear frame that has a switch operation unit, the intermediate gear unit being slidable along the support shaft.

Under the ordinary driving condition, the worm rotates and the worm wheel is rotated via the intermediate gear unit which receives either one of the thrusts along the support shaft, whereby the switch operation unit of the intermediate gear unit comes into contact with the resilient arm member of the limit switch of the reversing system in the forward or reverse power-feed circuit. When the antenna element is fully expanded or is fully contracted, the rotary member comes to a halt. In this case, the worm continues to rotate and the thrust of the intermediate gear unit increases. The switch operation unit then operates the resilient arm member to operate the reversible moving contact of the limit switch; i.e., the contact is opened and the motor comes to a halt. The motor is stopped instantaneously after the antenna is fully expanded or is fully contracted.

The thrust of the intermediate gear unit rotates the rotary member via a small gear of the intermediate gear unit. The drive torque is greatly reduced by the gear ratio, and the switch operation unit is operated with a thrust produced by a relatively small torque relative to the final output (torque for delivering or pulling the wire).

For example, when the operation force of the resilient arm member of the limit switch is set to 3 kg, the switch operation unit gain a thrust which just comes into contact with the resilient arm member provided the intermediate gear unit is operated with a thrust of smaller than 3 kg under the ordinarily driven condition. When the rotary member is stopped after the antenna is fully expanded or is fully contracted, the thrust of the intermediate gear unit increases instantaneously, and the switch operation unit gains a thrust of greater than 3 kg to operate the resilient arm member. Therefore, the reversible moving contact is opened to turn the contact off, and the motor is stopped immediately.

Furthermore, a control resilient piece that follows the resilient arm member is arranged for the resilient arm member of the limit switch, and a control member is slidably provided between the control portions of the control resilient piece to limit the operation range when the reversible moving contact is opened. When one resilient arm member turns off the reversible moving contact being operated by the switch operation unit (under this operation condition, the switch operation unit of the side opposed to the other resilient arm member is retracted), the control member is operated by the control resilient piece of the side that is operated, and the operation range for opening the reversible moving contact is limited.

When the motor is driven by the power-feed circuit via the other contact, the reversible movable contact that remains turned off under the above-mentioned limited condition causes the control member to move as the control resilient piece of the other side is actuated by the operation of the other switch operation unit. At the same time, the reversible moving contact that had been turned off is reset and limits the operation range for opening the other reversible moving contact in the same manner as described above. That is, the operation range for opening the reversible moving contact ha such a relationship that the reversible moving contact is reset by a function of the limit member when the resilient arm member is operated by the operation of the switch operation unit to discontinue the operation of the switch operation unit. As the other side is operated, therefore, the contact is turned on again, and the power-feed circuits for the motor are alternatingly reversed to establish a mutual relationship.

The switch operation unit operates the resilient arm member when the antenna is fully expanded or is fully contracted, or when an excess load is given to the expansion/contraction drive system, whereby the reversible moving contact is opened and the motor is stopped instantly. Furthermore, when there is no initial operation (e.g., when the motor does not rotate) or when the voltage of the car-mounted power source is so low that the motor does not produce enough output for the switch operation unit to depress the resilient arm member and that the reversible moving contact does not open, the contact is not mechanically opened and the electric power supplied to the motor is not turned off. In such case, a bimetal is employed for the reversible moving contact; i.e., heat is generated as an excess current flows through the bimetal. Namely, the contact is opened by utilizing the inflecting action of the bimetal to discontinue the supply of the power to the motor.

Under the condition where there does not take place any such mechanical operation, the control resilient piece does not operate the limit member in the operation range for opening the reversible moving contact; i.e., the reversible moving contact is greatly reversed without receiving any limitation at all. Therefore, the electric power is no longer supplied, and the reversible moving contact is not reset by its own force even when the temperature of the bimetal of the reversible moving contact is lowered. When the other operation is properly carried out, however, the limit member moves and one reversible moving contact that is reversed is pushed back into the operation limit range and is returned.

The two reversible moving contacts are not reset by their own forces. When the limit member is operated, however, a large reversing force of one reversible contact piece causes the other reversible moving contact to be reset. Therefore, either one of the reversible moving contacts establishes the conductive condition alternatingly.

BRIEF DESCRIPTION OF THE DRAWINGS

The drawings illustrate technical contents of the present invention, wherein.

BEST MODE FOR CARRYING OUT THE INVENTION

Figure 1:
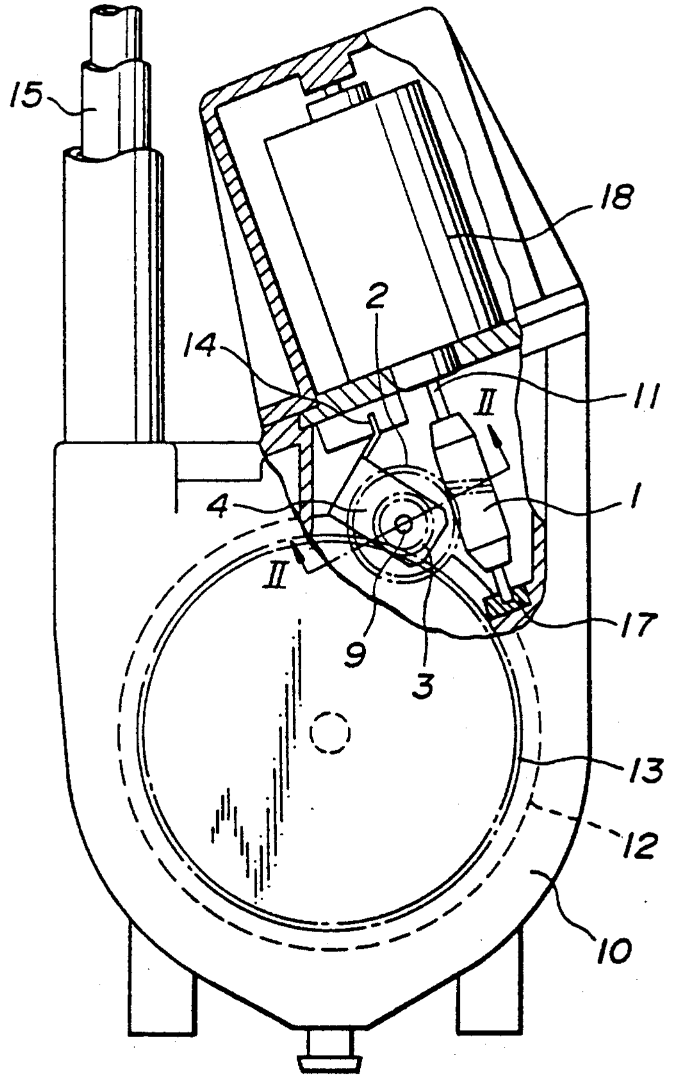
FIG. 1 is a partly cut-away front view illustrating the general constitution of a device according to the present invention.

An embodiment of the present invention will now be described concretely in conjunction with the accompanying drawings. FIG. 1 illustrates the general constitution of the device for automatically expanding and contracting the antenna according to the present invention. A wire or a rope (not shown) having one-end connected to the upper end of the antenna element 15 that undergoes expansion and contraction is wound on a drum 12 in a case 10 in a customary manner. The drum 12 is provided with a large gear 13 coaxially. To drive the large gear 13 by the motor 18, a worm 1 fitted to the rotary shaft 11 of the motor 18 is brought into engagement with a worm wheel 2 which is engaged with the large gear 13 via an intermediate gear unit having a small gear 3 formed together with the worm wheel coaxially therewith and as a unitary structure. Due to a gear ratio, therefore, the large gear 13 and the drum 12 are driven at a predetermined speed to expand or contract the antenna element 15.

The intermediate gear unit consisting of the worm wheel 2 and the-small gear 3 is provided together with a gear frame 4 to slide relative to a support shaft 9 that is provided on the case 10. The gear frame 4 is provided with switch operation units 14 and 14' in an opposing manner, and resilient arm members 5 and 5 are provided between the switch operation units 14 and 14'. Reversible moving contacts 6 and 6' are attached to the free ends of the resilient arm members 5 and 5' that are folded in a U-shape. The reversible moving contacts 6 and 6' in the diagramed embodiment form mounting portions *5a* and *5a'*that can be inflected toward the side of the base ends of the resilient pieces, and are attached to the resilient arm members 5, 5' at the mounting portions, and further have contact portions *6a*, *6a'*at the front end thereof. Positions of the shortest distances between the contact points *6a*, *6a'*and the mounting portions *5a*, *5a'*serve as neutral points, and the contact points *6a*, *6a'*are positioned on either side in excess of the neutral points so as to be inflected and urged. According to the present invention, however, the reversible moving contacts 6 and 6' are in no way limited to the above-mentioned type only but may be of the type of a reversing spring using a coil spring or a resilient wire to obtain the same reversing operation. Or, 15 the resilient contact pieces that are always urged to come into contact with the contact points may be turned off by the resilient arm member or by the switch operation unit.

Figure 5:
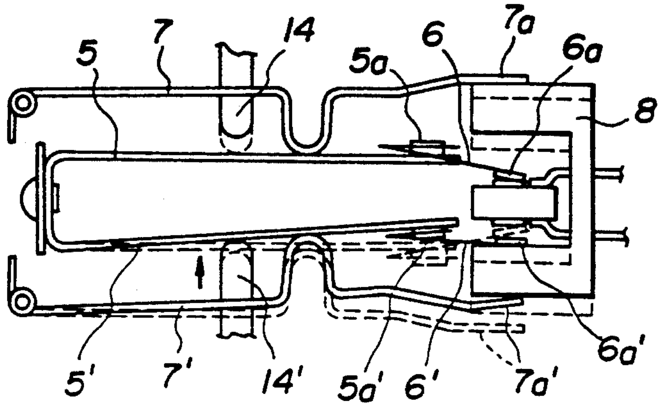
FIG. 5 is a plan view similar to FIG. 4 illustrating on an enlarged scale the operation when the antenna is fully expanded under the ordinary operation condition.
Figure 6A:
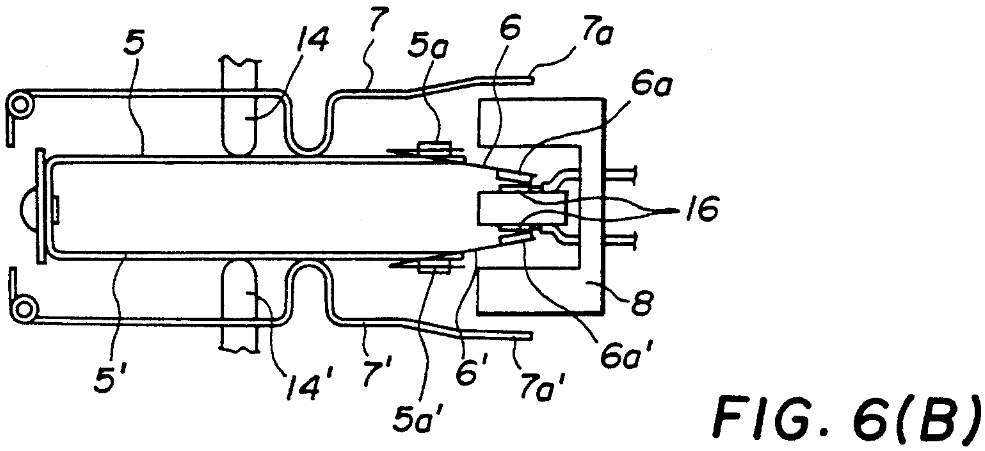
FIG. 6A and 6B are plan views illustrating on an enlarged scale the condition where the antenna is started to be contracted and the condition where the antenna is fully contracted.
Figure 6B:
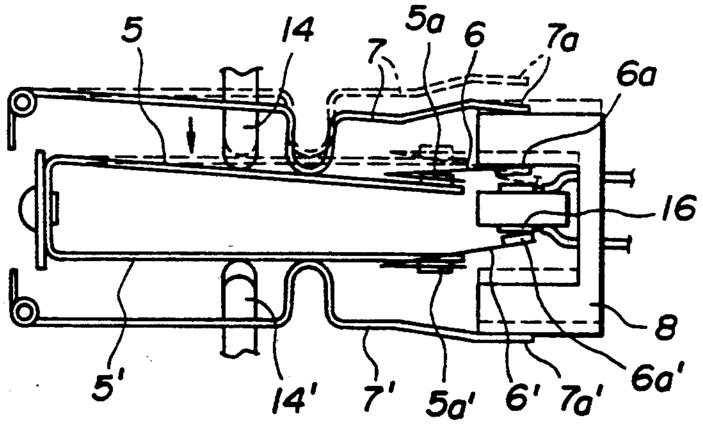

When the antenna element 15 is fully expanded or is fully contracted, the worm wheel 2, small gear 3 and gear frame 4 that are slidable relative to the support shaft 9 receive a thrust in the axial direction along the support shaft 9. That is, as the motor 18 is rotated in the forward or reverse direction and the antenna is fully expanded or is fully contracted, the drum 12 and the large gear 13 come to a halt and the worm wheel 2 ceases to rotate. Then, a thrust acts on the worm wheel 2 in the axial direction according to a helical angle (angle of tilted tooth) of the worm 1 that is kept rotated being driven by the motor 18, and the worm wheel 2 is thrusted in the axial direction (the direction is reversed depending upon whether the motor is rotated in the forward direction or in the reverse direction). Such a thrust is obtained even when the small gear 3 is tilted in the same direction as the plain gear or the worm wheel 2. With the small gear 3 having teeth inclined in the direction opposite to that of the gear of the worm wheel 2, however, the reaction is obtained efficiently under the condition where the worm 1 continues to rotate, and the thrust is effectively applied to the gear frame 4. The switch operation units 14 and 14' of the gear frame 4 depress the free ends of the resilient arm members 5 and 5 in a manner as shown in FIGS. 3(B) and 3(C) or as shown in FIG. 5 or 6(B), whereby the reversible moving contact 6 or 6' constituting the limit switch is opened to interrupt the power supply to the motor 18.

The power-feed circuits for feeding power from a DC source to the motor 18 are the same as those of the conventional art. As the direction of current for the motor 18 is switched, the motor 18 is rotated in the forward direction or in the reverse direction. The reversible moving contact 6 is provided in one of the power-feed circuits, and another reversible moving contact 6' is provided in the other power-feed circuit, and the two contacts are turned on by the separately provided power source operation switch to feed the power.

Figure 3A:
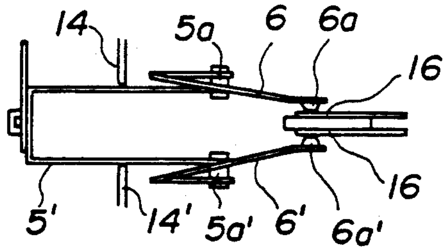
FIG. 3A-3C are a diagram which stepwisely illustrates the on-off operation of the limit switch.
Figure 3B:
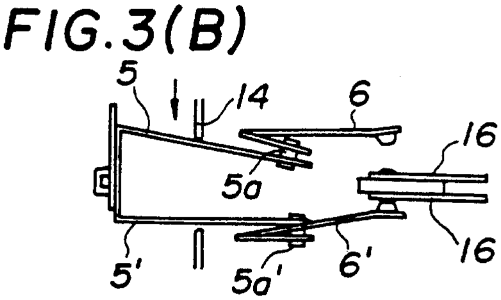
Figure 3C:
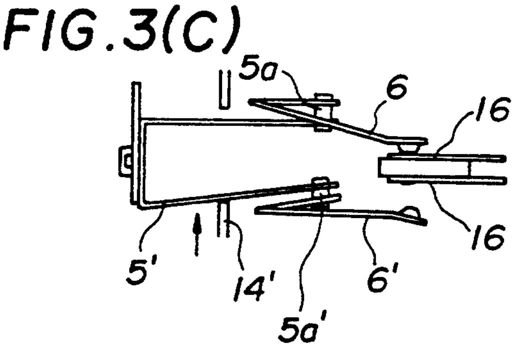

The resilient arm members 5 and 5' represent a sense pressure (resilient pressure) of the limit switch and operate the sense pressure of the limit switch as shown in FIG. 3 based on the thrust of the worm wheel 2 driven by the worm 1. By utilizing the resilient pressure in the limit switch, therefore, the motor is turned off in response to the thrust in the mechanical system for expanding and contracting the antenna element without requiring any particular clutch mechanism. That is, the force acting on the worm wheel 2 that rotates the rotary member such as a drum or a gear that is the final output member via the intermediate gear unit having small gear 3, is considerably smaller than the final output owing to the gear ratio. The thrust obtained by the worm wheel 2 meets the sense pressure switch and is suited for operating the small limit switch. That is, no large or strong member or force is required, and experiments have proved the durability of greater than 200,000 times which is far superior to the durability of the conventional mechanical clutch mechanism. The switch is turned off from the condition shown in FIG. 3(A) to the condition shown in FIG. 3(B) at a moment when the thrust is obtained on the worm wheel 2, and the motor 18 is stopped. Therefore, a strong coil spring needs not be suppressed, and a large pushing force or pulling force does not continuously act on the expansion/contraction wire, contributing to improving the durability of the expansion/ contraction wire and eliminating the buffer mechanism for the expansion/contraction wire.

The worm shaft may be a generally employed one; i.e., it does not affect the transmission of torque from the motor 18, exhibits good operation characteristics and does not develop any inconvenience. By suitably adjusting the position at which the switch operation units 14 and 14' come in contact with the resilient arm members 5 and 5', the ON-OFF operation force can be easily adjusted. Thus, there is realized a mechanism which maintains the most efficient operability or proper operability that becomes important depending upon the cases.

As described above, the worm wheel is operated by a thrust which is considerably smaller than the final output, and there can be used considerably small resilient arm members for operating the gear frame and the limit switch so as to be effectively incorporated between the worm and the rotary member such as the drum. The whole device for expanding and contracting the antenna can then be realized in a compact size and at a considerably reduced cost. FIG. 3 illustrates a limit switch having a basic structure according to the present invention, wherein FIG. 3(A) shows the condition where the resilient arm members 5 and 5' are not operated by the switch operation members 14 and 14', and FIGS. 3(B) and 3(C) show the moments at which the contact points of the limit switch are opened when the antenna load is fully expanded or is fully contracted or when an excess is given to the expansion/contraction drive system.

Figure 2:
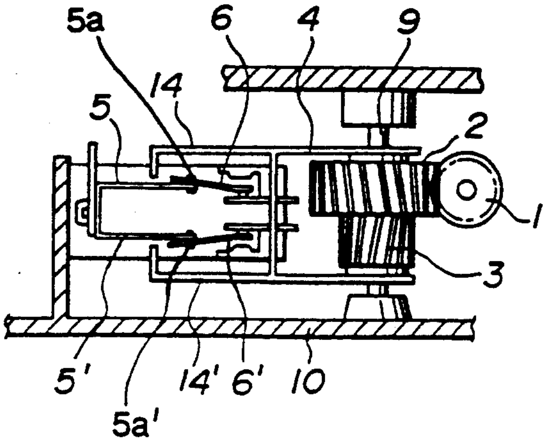
FIG. 2 is a side view of a worm wheel portion.
Figure 4:
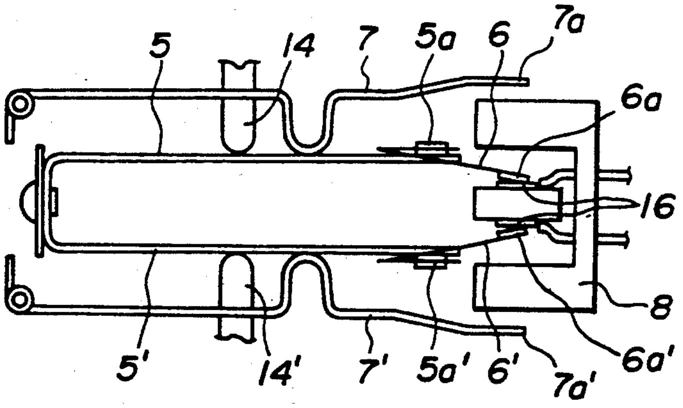
FIG. 4 is a plan view illustrating on an enlarged scale another limit switch operation portion of the present invention.

FIG. 4 and subsequent drawings illustrate another embodiment of the present invention which carries out proper operation under ordinary operation conditions and which further copes with abnormal conditions (e.g., motor does not rotate) or with such cases where the voltage of the car-mounted power source has so dropped that the operation is not effectively operated. That is, the worm 1, worm wheel 2, large gear 13, small gear 3, gear frame 4 switch operation units 14, support shaft 9, resilient arm member 5 and reversible moving contact 6, are the same as those mentioned in conjunction with FIGS. 1 to 3. In the embodiment shown in FIG. 4 and in the subsequent drawings, however, control resilient piece 7 and 7' are provided to move following the resilient arm members 5 and 5', and a limit member 8 of a U-shape in plane is movably provided between the control portions *7a* and *7a'* formed at the ends of the control resilient pieces 7 and 7' to limit the operation range when the reversible moving contacts 6 and 6' are opened. Furthermore, the reversible moving contacts 6, 6' are composed of a bimetal such that they will undergo deformation due to the heat generated when a heavy current flows therethrough.

The operation of the device of FIG. 4 under ordinary condition is as shown in FIGS. 5 and 6(B). That is, when the large gear 13 stops, and the worm wheel 2 and the small gear 3 stop, too, under the condition where the antenna element is fully expanded and the worm 1 continues to rotate being driven by the motor, then the gear frame 4, worm wheel 2 and small gear 3 slide in the axial direction, whereby one resilient arm member 5 is pushed by one switch operation unit 14 and the reversible moving contact 6 is turned off. The control resilient piece 7 advances following the resilient arm member 5 that is depressed, and the control portion 7*a* brings the limit member 8 close to the reversible moving contact 6, such that the reversing operation range is narrowed when the reversible moving contact piece 6 is turned off. That is, when a moving contact of the reversible moving contact 6 is separated away from the fixed contact point so that the power-feed circuit is opened under the above-mentioned limited condition, then the moving contact is maintained at a position slightly in excess of the neutral point.

When the operation for expanding or contracting the antenna element is started (contracted after it is fully expanded or expanded after it is fully contracted), the reversible moving contact 6, of which the off operation quantity is limited, causes the other switch operation unit 14 to push the other resilient arm member 5 . Here, however, one switch operation unit 14 and the other switch operation unit 14′ are formed in a gear frame 4 as a unitary structure as shown. As the other switch operation unit 14 effects the pushing operation, therefore, the one switch operation unit 14 that had been pushed is now retracted. As the one switch operation unit 14 is retracted, therefore, the resilient arm member 5 is retracted, too, whereby the mounted portion 5*a* of the reversible moving contact 6 moves back in excess of the neutral point. Therefore, the reversible moving contact 6 returns back to the condition of FIG. 4, i.e., the condition it was in before 6 was turned off, and comes into contact with the fixed contact point 16 as shown in FIG. 6(A) to establish such a condition that the antenna element is urged in the reverse direction (expanding or contracting direction) when the motor 18 is next operated. Such an operation is alternatingly repeated, i.e., the ordinary operation is carried out successively to expand or contract the antenna without permitting a heavy current to flow through the reversible moving contacts 6, 6′ and preventing the motor 18 from being burned out or damaged.

The same operation is carried out even in a case, for example, where the antenna is bent. When the load equal to that of when the antenna is fully expanded or contracted is exerted despite the antenna element 15 being not in fact fully expanded or fully contracted, the members up to the worm wheel 2 come to a halt despite that the motor continues to rotate, and the thrust is obtained on the worm wheel 2 and on the gear frame 4. Therefore, the reversible moving contacts 6, 6′ carry out the turn-off operation quite in the same manner as described above, and the restoration operation is effected.

Figure 7A:
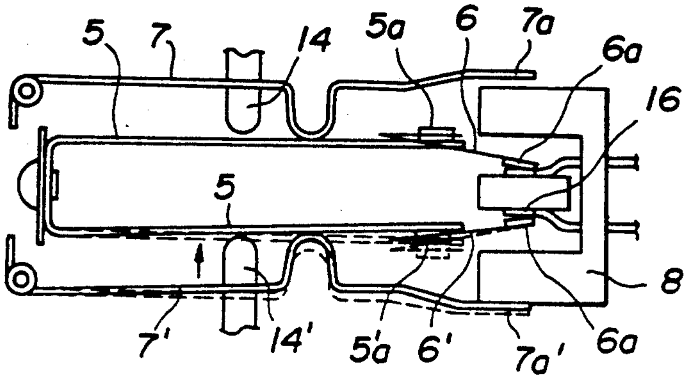
FIGS. 7(A), 7(B) and 7(C) are plan views illustrating the operation condition under abnormal condition such as when the voltage of the power source is lowered and the subsequent inflecting conditions of the reversible moving contact is caused by the generation of heat.
Figure 7B:
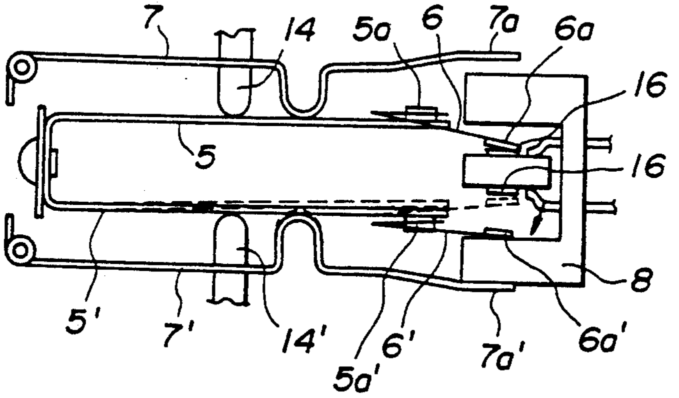

On the other hand, when the voltage has dropped due to an insufficiently charged condition of the car-mounted power source that supplies power to the motor 18 or due to a change in the external conditions, the switch operation unit 14′ of the gear frame 4 may not work to depress the resilient arm member 5′ or may be too weak to depress the resilient arm member 5′. In such a case, the mounting portion 5*a*′ of the reversible moving contact 6′ that is under there on condition as shown in FIG. 7(A) is inflected. As a heavy current flows, therefore, the reversible moving contact 6′ composed of a bimetal generates heat and is inflected. Due to the action of the bimetal, therefore, the contact is opened from the fixed contact point 16, and the electric power is no longer supplied to the motor 18 as indicated by a solid line in FIG. 7(B).

Figure 7C:
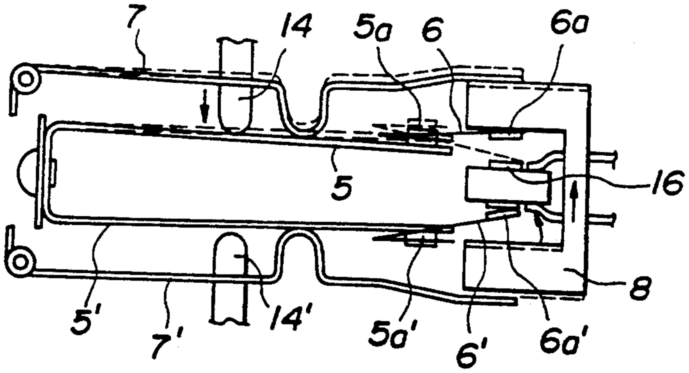

When the one reversible moving contact 6′ is turned off by the action of the bimetal, however, the limit member 8 is not almost pushed by the control resilient piece 7′, and there does not substantially exist any means for limiting the turn-off operation range of the reversible moving contact. Therefore, the reversible moving contact 6′ is reversed to a degree greater than that of under the ordinary operation condition. When the temperature of the reversible moving piece 6′ has dropped as a result of the switch-off of heavy current, the reversible moving contact 6′ is not restored by its own restoration action despite that the temperature has dropped; i.e., the greatly inflected turn-off condition is maintained. The reversible moving contact 6′ which is under the off condition then undergoes the switch-on operation to urge antenna element 15 in the opposite direction (in the contracting direction when it has been fully expanded or in the expanding direction when it has been fully contracted). The switch operation unit 14 of the opposite side then pushes the resilient arm member 5 with an ordinary force as shown in FIG. 7(C), and the control resilient piece 7 of the opposite side pushes back the reversible moving contact 6′ that has been greatly inflected to the turn-off condition, in excess of its neutral point via the limit member 8, to be ready for urging the antenna element the next time.

Figure 8:
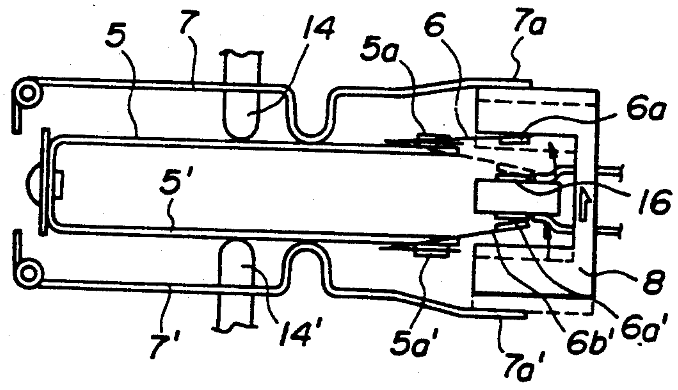
FIGS. 8 and 9 are plan views illustrating on an enlarged scale the repeating operation of the reversible moving contact which is under the inflected condition due to the generation of heat.
Figure 9:
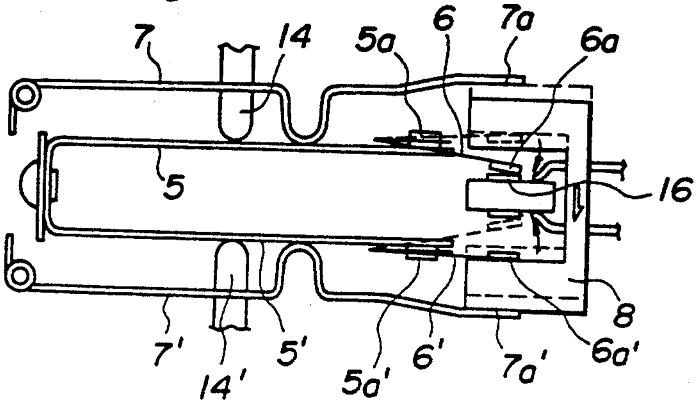

When the normal force of action is still not reached even when the resilient arm member is depressed by the switch operation unit of the opposite side due to an abnormal factor such as drop of voltage in the power source, the reversible moving contact is not restored by its own force. Therefore, the reversible moving contact is maintained under the inflected off condition. The limit member 8 is slid to the opposite side as the reversible moving contact 6 or 6′ is inflected by the generation of heat. Being assisted by the restoration action of the bimetal when it is cooled, therefore, the action of the limit member 8 causes the one reversible moving contact that had been maintained under the inflected off condition to be restored. That is, the two reversible moving contacts repeat their operation when they are inflected by generation of heat to establish a relationship that is shown in FIG. 8 or 9.

Figure 10:
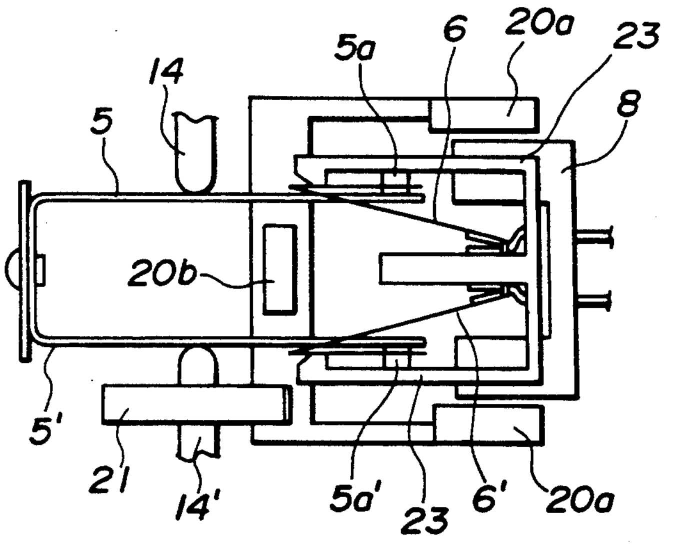
FIG. 10 is a plan view illustrating on an enlarged scale one embodiment of the present invention.
Figure 11:
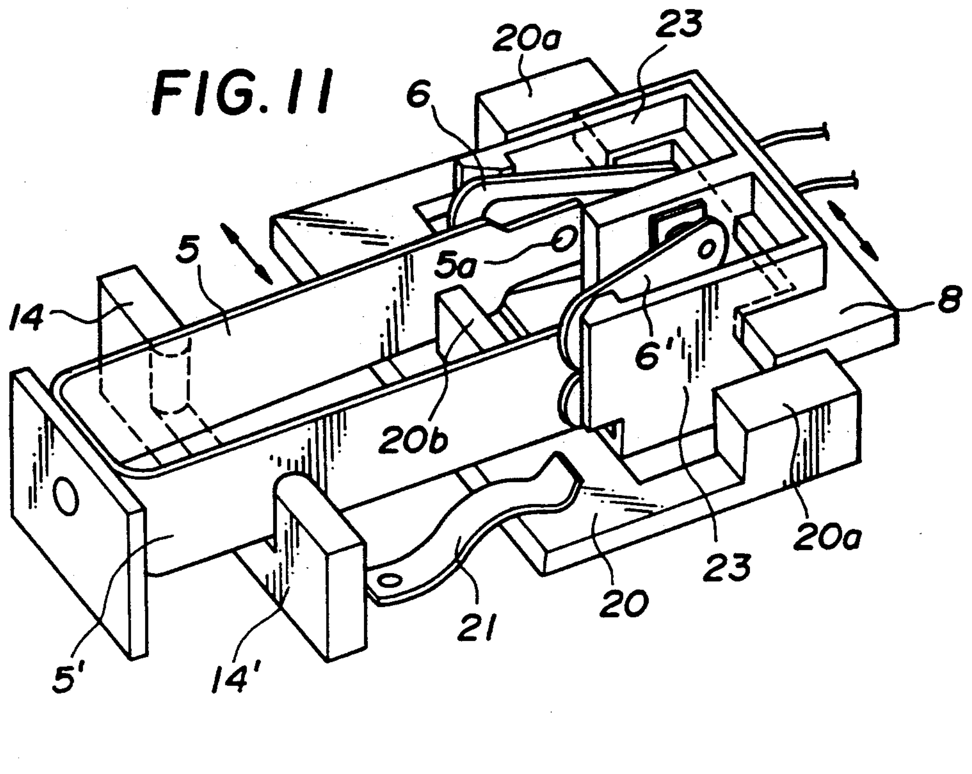
FIG. 11 is a perspective view of FIG. 10.

FIGS. 10 and 11 illustrate another embodiment of the present invention. That is, resilient arm member 5 and 5′ are provided between the switch operation units 14 and 14′ provided for the gear frame 4, reversible moving contacts 6 and 6′ are attached to the ends of the and members 5 and 5′, and the power-feed circuits are turned on and off to turn the motor in the forward direction or in the reverse direction in the same manner as those of up to FIG. 9. According to the embodiment of FIGS. 10 and 11, however, a control operation piece 20 is used in place of the control resilient piece 7. A passive portion 20*b* formed at the middle portion of the control operation piece 20 is positioned between the arm members 5 and 5′. The control operation piece 20 as well as the reversible moving contacts 6 are operated by the operational force of the arm member actuated by the switch operation unit 14. Further, the U-shaped limit member 8 and U-shaped secondary limit member 23, connected thereto having a U-shape are slidably moved by the operation portions 20*a* formed at the tips of the control operation piece 20 in a similar manner as in the embodiment shown in FIGS. 4 to 9. The inflecting operation of the reversible moving contacts 6 is finely controlled and adjusted, under operation conditions by the limit member 8 and the secondary limit member 23 that is slidably moved, in a similar manner as in the embodiment explained in conjunction 4 to 9. A resilient pressure piece 21 is suitably arranged to contact a positioning portion 20*c* of the control operation piece 20 to limit the control operation piece 20 from undesirably moving and to maintain a properly operating relationship at all times.

Figure 12:
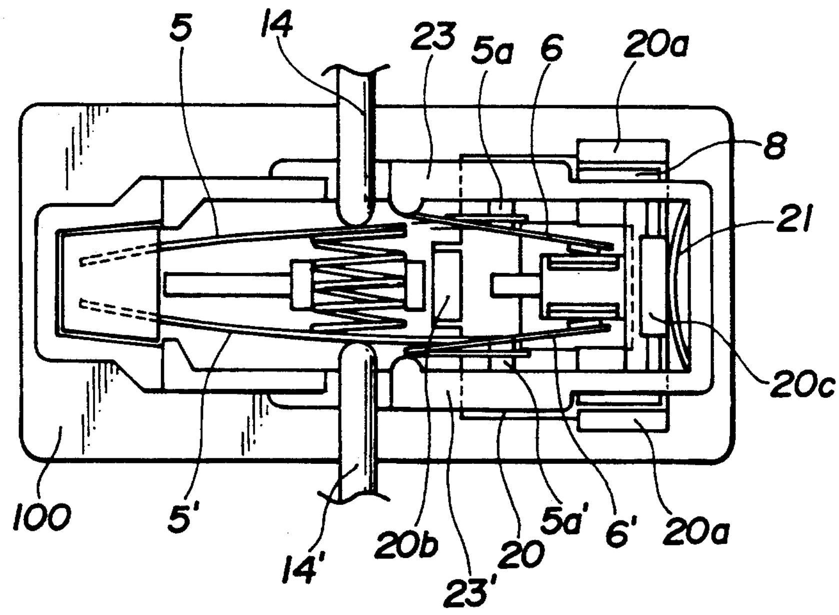
FIG. 12 is a plan view illustrating on an enlarged scale another embodiment of the present invention.
Figure 13:
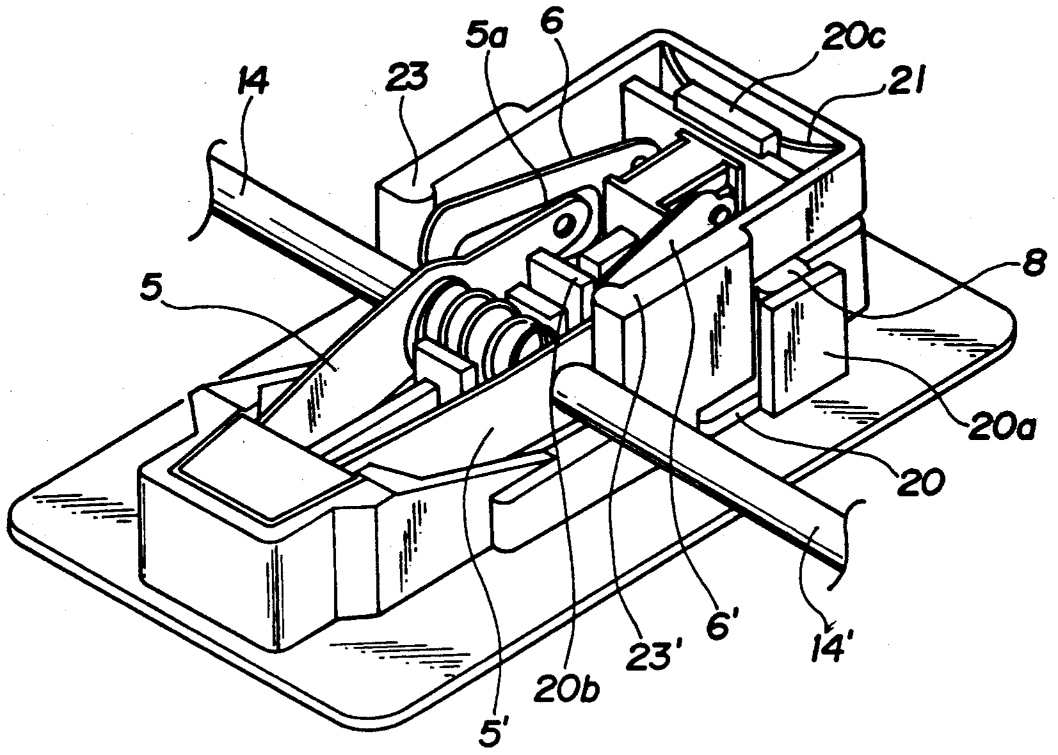
FIG. 13 is a perspective view of FIG. 12.

FIGS. 12 and 13 illustrate another embodiment of the present invention, not having said U-shape.

INDUSTRIAL APPLICABILITY

According to the present invention as explained in the foregoing, there is no need of incorporating a clutch in the drum portion or in other portions of the device, and switch operation units are employed for a small gear frame which holds an intermediate gear unit that consists of a worm wheel and a small gear formed as a unitary structure to transmit the drive force of the motor to the drum via the worm. Furthermore, the limit switch connected to the motor is turned on and off with a relatively small operational force to quickly bring the antenna expansion/contraction operation to a halt. Therefore, the whole mechanism is constituted in a sufficiently compact size. Moreover, durability of the device is no longer affected by the clutch mechanism. Accordingly, durability of the device for automatically expanding and contracting the antenna is improved, no buffer mechanism for protection is required for the expansion/contraction wire (or rope), transmission of torque of the motor is not interrupted and the operation performance is not impaired, presenting great advantage.

According to a second embodiment of the present invention, furthermore, the effectively operating relationship is maintained even under abnormal conditions where sufficiently large operational force is not obtained for automatically expanding and contracting the antenna that is mounted on the car due to a drop in the voltage of a car-mounted power source. Even under ordinary operation conditions, furthermore, the operation range for opening the reversible moving contact that is turned off is limited to maintain an operation relationship easily and properly. Therefore, almost no heat is generated during the ordinary operation but is generated in a limited manner only during abnormal conditions. This makes it possible to prevent the motor from burning out, thus presenting great advantages.

I claim:

1. A device for automatically expanding and contracting an antenna, comprising:

- a rotary member for moving a flexible rodlike member that is coupled to the antenna for expanding and contracting the antenna;
- a worm, driven by a motor to rotate about a motor axis;
- an intermediate gear unit having a worm wheel formed unitarily with a small diameter gear and a gear unit support frame coupled to the worm wheel and the small diameter gear, the worm wheel being engaged with the worm and the small diameter gear being engaged with the rotary member for rotatably driving the rotary member;
- a support shaft fixed to a casing member and supportingly coupled to the intermediate gear unit, the intermediate gear unit being axially movable along the support shaft in a direction substantially perpendicular to the motor axis;
- a limit switch means for interrupting a power-feed circuit that supplies power to drive the motor in either a forward or reverse direction; and
- a switch operation means for operating the limit switch means responsive to a movement of the intermediate gear unit along the support shaft.

2. A device for automatically expanding and contracting an antenna as set forth in claim 1, wherein the intermediate gear unit moves along the support shaft when the antenna is fully expanded or fully contracted.

3. A device for automatically expanding and contracting an antenna as set forth in claim 1, wherein the switch operation means is coupled to the intermediate gear unit to be movable with the intermediate gear unit support frame in a direction substantially perpendicular to the motor axis, and the limit switch means is fixed on the casing member and is operated response to a movement of the switch operation means in a direction substantially perpendicular to the motor axis.

4. A device for automatically expanding and contracting an antenna as set forth in claim 1, wherein the rotary member comprises a drum.

5. A device for automatically expanding and contracting an antenna as set forth in claim 1, wherein the rotary member comprises a gear.

6. A device for automatically expanding and contracting an antenna as set forth in claim 1, wherein the flexible rodlike member comprises a wire.

7. A device for automatically expanding and contracting an antenna as set forth in claim 1, wherein the flexible rodlike member comprises a rope.

8. A device for automatically expanding and contracting an antenna as set forth in claim 1, wherein the limit switch means includes a bimetal reversing spring, resilient arm members that are operated to open and close the reversing spring, control resilient members for controlling the operation of the resilient arm members, and a limit member movably provided between the control resilient members for causing the control resilient members to limit operation of the resilient arm members when the reversing spring is opened.

9. A device for automatically expanding and contracting an antenna as set forth in claim 1, wherein the limit switch means includes a reversing spring, resilient arm members that are operated to open and close the reversing spring, at least one rigid control operation member for controlling the operation of the resilient arm members, a resilient pressure piece for providing frictional resistance to maintain proper operation of the at least one rigid control operation member, and the at least one rigid control operation member comprises a limit member for causing the at least one rigid control operation member to limit operation of the resilient arm members when the reversing spring is opened.

10. A device for automatically expanding and contracting an antenna, comprising:

- a rotary member for moving a flexible rodlike member that is coupled to the antenna for expanding and contracting the antenna;
- a worm, driven by a motor to rotate about a motor axis;
- an intermediate gear unit having a worm wheel formed unitarily with a small diameter gear and a gear unit support frame coupled to the worm wheel and the small diameter gear, the worm wheel being engaged with the worm and the small diameter gear being engaged with the rotary member for rotatably driving the rotary member;

a support shaft fixed to a casing member and supportingly coupled to the intermediate gear unit, the intermediate gear unit being axially movable along the support shaft in a direction substantially perpendicular to the motor axis;

a limit switch means fixed on the casing member for interrupting a power-feed circuit that supplies power to drive the motor in either a forward or reverse direction, the limit switch means comprising a reversing spring composed of a bimetal, resilient arm members that are operated to open the reversing spring, control resilient members for limiting the operation of the resilient arm members, and a limit member movably provided between the control resilient members for controlling the control resilient members to limit the operation of the resilient arm members when the reversing spring is opened; and a switch operation means, coupled to the intermediate gear unit to be movable with said intermediate gear unit in a direction substantially perpendicular to the motor axis, for operating the limit switch means responsive to a movement of the switch operation means in a direction substantially perpendicular to the motor axis when the antenna is fully expanded or fully contracted.

* * * * *